United States Patent [19]

Tabor et al.

[11] Patent Number: 5,089,556

[45] Date of Patent: * Feb. 18, 1992

[54] ADHESIVE, RF HEATABLE GRAFTED POLYMERS AND BLENDS

[75] Inventors: Ricky L. Tabor; Chad A. Strait, both of Lake Jackson; Gerald M. Lancaster, Freeport, all of Tex.

[73] Assignee: The Dow Chemical Company, Midland, Mich.

[*] Notice: The portion of the term of this patent subsequent to May 22, 2007 has been disclaimed.

[21] Appl. No.: 458,113

[22] Filed: Dec. 28, 1989

Related U.S. Application Data

[63] Continuation-in-part of Ser. No. 229,078, Aug. 5, 1988, Pat. No. 4,927,888, which is a continuation-in-part of Ser. No. 905,099, Sep. 5, 1986, Pat. No. 4,762,890.

[51] Int. Cl.$^5$ .............................................. C08L 51/00
[52] U.S. Cl. ...................................... 525/64; 525/419; 525/539
[58] Field of Search .................... 525/63, 64, 419, 539

[56] References Cited

U.S. PATENT DOCUMENTS

| | | | |
|---|---|---|---|
| 4,391,923 | 7/1983 | Rys-Sikora | 521/96 |
| 4,480,054 | 10/1984 | Enderle | 521/84.1 |
| 4,600,614 | 7/1986 | Lancaster et al. | 428/35 |
| 4,601,948 | 7/1986 | Lancaster et al. | 428/349 |
| 4,613,533 | 9/1986 | Loomis et al. | 428/36 |
| 4,640,865 | 2/1987 | Lancaster et al. | 428/421 |
| 4,660,354 | 4/1987 | Lancaster et al. | 53/469 |
| 4,671,992 | 6/1987 | Lancaster et al. | 428/316.6 |
| 4,678,713 | 7/1987 | Lancaster et al. | 428/421 |
| 4,684,576 | 8/1987 | Tabor et al. | 428/441 |
| 4,728,566 | 3/1988 | Lancaster et al. | 428/286 |
| 4,762,731 | 8/1988 | Lancaster et al. | 427/40 |
| 4,762,890 | 8/1988 | Strait et al. | 525/257 |
| 4,766,035 | 8/1988 | Lancaster et al. | 428/345 |
| 4,787,194 | 11/1988 | Lancaster et al. | 53/469 |
| 4,814,378 | 3/1989 | Lutz | 525/55 |
| 4,841,020 | 6/1989 | Drent | 528/392 |
| 4,847,155 | 7/1989 | Lancaster et al. | 428/421 |
| 4,927,888 | 5/1990 | Strait et al. | 525/285 |

Primary Examiner—Melvyn I. Marquis
Assistant Examiner—D. E. Aylward

[57] ABSTRACT

Ethylene polymers grafted with dicarboxylic acid functionality have synergistically improved adhesive properties and acquire heatability employing RF electromagnetic radiation when blended with a carbon monoxide-containing ethylene polymer. The dicarboxylic acid grafted and carbon monoxide-containing ethylene polymers and blends thereof are particularly useful as adhesive layers in laminate structures where RF heat sealing methods can be employed.

26 Claims, No Drawings

യ്യ5,089,556

ADHESIVE, RF HEATABLE GRAFTED POLYMERS AND BLENDS

CROSS-REFERENCE TO RELATED APPLICATIONS

This application is a continuation-in-part application of U.S. Ser. No. 229,078, filed Aug. 5, 1988, now U.S. Pat. No. 4,927,888, which in turn is a continuation-in-part application of U.S. Ser. No. 905,099, filed Sept. 5, 1986, now U.S. Pat. No. 4,762,890.

FIELD OF THE INVENTION

This invention relates to ethylene polymers and blends containing grafted dicarboxylic acid functionality which have adhesive properties and are heatable by RF electromagnetic radiation. More particularly, this invention relates to dicarboxylic acid grafted and carbon monoxide-containing ethylene polymers and blends thereof which are useful as adhesive layers in laminate structures where RF heat sealing methods can be employed.

BACKGROUND ART

The use of high-frequency electromagnetic energy as a means of heating polymers is an advancing art which finds application in many fields. For instance, sealing of a polymer to itself or to some other substrate can be an important commercial technique in producing a desired end-product. However, there are some polymers which are not generally suitable for high-frequency heating operations. In such polymers, high-frequency heating either does not occur, or if it occurs, it does so slowly. In production assembly lines, a quick heat-seal is important.

Among the polymers which are ill-suited for high frequency heating are olefin polymers, e.g., polymers and copolymers of ethylene, propylene, styrene or other $\alpha$-olefinically unsaturated hydrocarbons having 2 to 10 carbon atoms. Some of these olefin polymers may contain polar groups, or polarizable groups which are generally introduced by the copolymerization of acrylic (or methacrylic) acids or their alkyl esters as comonomers with the $\alpha$-olefins Such polar groups may, at high levels of incorporation, tend to impart a modicum of high-frequency heatability to the polymer, but the efficacy is generally so slight that it is not feasible on a commercial basis. Some polymers having polar groups, e.g., chlorinated polyethylene (CPE), ethylene/vinyl acetate copolymer (EVA), polyvinylchloride (PVC), polyvinylidene chloride (PVDC), and polyamides can be radiation heated at certain frequencies of electromagnetic radiation, but are not generally heated at the higher frequencies which are frequencies of current commercial interest.

Polyethylene is shown in the art to be substantially unsuitable for high-frequency heating unless sensitizers are added to the polymer; this observation applies regardless of whether the polyethylene is linear or branched, or regardless of whether it is low, medium, or high density (see, for example, U.S. Pat. Nos. 3,336,173; 3,640,913; and 3,810,799).

U.S. Pat. Nos. 4,847,155; 4,787,194; 4,766,035; 4,762,731; 4,684,576; 4,678,713; 4,671,982; 4,660,354; 4,640,865, 4,601,948; and 4,600,614, all to Lancaster et al., disclose high frequency (HF) heatable or sealable ethylene-carbon monoxide (ECO) copolymers. It is stated, for example, in U.S. Pat. No. 4,601,948 that non-HF-heatable or non-HF-sealable polymers can be made to be HF-sealable by either incorporation of carbon monoxide by copolymerization or by blending or grafting a carbon monoxide copolymer or terpolymer into the polymer matrix. This patent additionally discloses ethylene-carbon monoxide-acrylic acid and ethylene-carbon monoxide methacrylic acid terpolymers which have HF-sealability and improved adhesion.

Grafting unsaturated monomer molecules onto $\alpha$-olefin polymers and copolymers has been disclosed in a number of patents. The grafting technique has been used to modify the polymer properties to which the grafted molecules are attached. The following patents are representative of the prior art on grafting: U.S. Pat. Nos. 2,970,129; 3,177,269; 3,270,090; 3,873,643; 3,882,194; 3,886,227; 4,087,587; 4,087,588; 4,239,830; 4,298,712; 4,394,485; U. K. Patent 2,081,723; Jap. Kokai 49(1973)-129742.

U.S. Pat. No. 4,684,576 to Tabor et al. discloses maleic anhydride grafted high density polyethylene (HDPE) which is blended with low density polyethylene (LDPE) and linear low density polyethylene (LLDPE). These blends are stated to impart enhanced adhesive properties. These grafted and blended polymers lack carbon monoxide as a component, however, and are not suitable to be heated by high frequency electromagnetic energy.

From U.S. Pat. No. 4,814,378 to Lutz, it is known to blend ECO with copolymers of a vinyl aromatic compound and an unsaturated cyclic anhydride compound. Blends of ECO with styrene-maleic anhydride copolymer, for example, are stated to have improved processability and melt stability.

U.S. Pat. Nos. 4,391,923 to Rys-Sikora; and 4,613,533 to Loomis et al. disclose blends of ethylene/X/Y formula ethylene terpolymers with polyvinyl halides such as PVC, which are used to make molded or low density, closed-cell, foamed articles. The Y component is stated to be CO or $SO_2$ and the X component is a softening monomer. U.S. Pat. No. 4,480,054 to Enderle is similar except that an ethylene-methacrylic acid (EMAA) or ethylene-acrylic-acid (EAA) copolymer is blended with ethylene-vinyl acetate-carbon monoxide terpolymer (EVACO) in place of PVC.

From U.S. Pat. No. 4,841,020 to Drent, it is known to prepare terpolymers of carbon monoxide, a functionally substituted ethylenically unsaturated compound wherein the functional substituent, which may be a carboxylic acid, is separated from the ethylenic unsaturation by a divalent bridging group of at least one carbon, and optionally an ethylenically unsaturated hydrocarbon.

SUMMARY OF THE INVENTION

It has been discovered that polymer compositions containing polymerized carbon monoxide and grafted dicarboxylic acid functionality, either in a copolymer containing both and/or in blends of polymers containing each separately, surprisingly have enhanced adhesive properties and are RF heatable.

In one aspect, the present invention provides blends of an ethylene polymer grafted with an unsaturated dicarboxylic acid or anhydride, and an ethylene-carbon monoxide copolymer. The blended polymer compositions are RF heatable and have surprisingly superior adhesive properties in comparison to either singular blend component.

In another aspect, the present invention provides a copolymer of ethylene and carbon monoxide grafted with an unsaturated dicarboxylic acid or anhydride. The grafted copolymer of this invention is particularly useful alone and in blends with other polymers as a component layer in a laminate because of its surprisingly excellent adhesive properties and RF heatability.

A further aspect of the present invention provides laminates having a substrate having adhered to at least a portion of a surface thereof, an adhesive, RF heatable polymer blend comprising an ethylene-carbon monoxide copolymer blended with a grafted ethylene polymer. The grafted ethylene polymer is obtained by grafting an ethylene polymer with an $\alpha$, $\beta$-ethylenically unsaturated dicarboxylic acid or anhydride.

Yet another aspect of the invention provides a laminate having a substrate having adhered to at least a portion of a surface thereof, a copolymer of ethylene and carbon monoxide grafted with an $\alpha$, $\beta$-ethylenically unsaturated dicarboxylic acid or anhydride.

The present invention also provides a method of making a laminated structure. The method includes placing an RF heatable polymer blend adjacent to at least a portion of a substrate surface, subjecting the blend to RF radiation to melt the RF heatable blend to effect bonding between the blend and the surface, and cooling the blend to obtain a laminate structure of the blend in adhesive contact with the substrate surface. The RF heatable polymer blend comprises ethylene-carbon monoxide copolymer and a grafted ethylene polymer obtained by grafting an ethylene polymer with $\alpha$, $\beta$-ethylenically unsaturated dicarboxylic acid or anhydride.

In addition, the present invention provides another method of making a laminated structure. The method includes placing an RF heatable, grafted ethylene polymer adjacent to at least a portion of a substrate surface, subjecting the polymer to RF radiation to melt the RF heatable grafted ethylene polymer to effect bonding between the grafted ethylene polymer and the surface, and cooling the grafted ethylene polymer to obtain a laminate structure of the grafted ethylene polymer in adhesive contact with the substrate surface. The RF heatable grafted ethylene polymer comprises an ethylene-carbon monoxide copolymer grafted with an $\alpha$, $\beta$-ethylenically unsaturated dicarboxylic acid or anhydride.

DETAILED DESCRIPTION OF THE INVENTION

The present invention involves, in one aspect, blends of an ethylene-carbon monoxide (ECO) copolymer with a dicarboxylic acid-grafted polyolefin. The methods and techniques of preparing ECO copolymers and terpolymers are well known to practitioners of the relevant polymer art. For the most part, carbon monoxide-containing olefin copolymers of interest in this present disclosure are prepared by the well known high pressure, high temperature, free-radical initiated, polymerization method such as the historically-popular ICI process or such as disclosed in U.S. Pat. No. 2,497,323. However, those polymerization processes which employ certain of the coordination catalysts or metal catalysts (e.g., the well-known Ziegler-type, Natta-type, or Phillips-type) may be used by selecting a catalyst (such as in U.S. Pat. No. 3,083,184) which is not easily poisoned or deactivated by carbon monoxide, or other oxygen-containing monomer, which is generally highly reactive with many metal carbon bonds.

ECO copolymers within the purview of this invention, and which are rendered heatable (by high-frequency electromagnetic radiation) by incorporating carbon monoxide groups into the polymer chain, are polymers formed by polymerizing ethylene and carbon monoxide, optionally with a small proportion of one or more $C_3$-$C_8$ aliphatic olefins for property modification. The monomers can also include a hydrocarbyl ester of an unsaturated organic acid having 3 to 8 carbon atoms, such as acrylic acid, methacrylic acid, 1-butenoic acid, and the like, or a vinyl ester of a carboxylic acid. Hydrocarbyl esters of these acids which may be mentioned include methyl acrylate, ethyl acrylate, methyl methacrylate, 2-ethylhexyl acrylate, and the like. A specific representative example of a vinyl ester of a carboxylic acid is vinyl acetate. As used herein, the term "copolymer" is understood to be inclusive of copolymers and terpolymers containing one or more termonomers in addition to ethylene and carbon monoxide (CO). Hydrogenated CO-containing olefin polymers (which have H—C—OH groups along the polymer chain) are included here, such as hydrogenated ECO copolymers. U.S. Pat. No. 2,495,292 discloses methods of hydrogenating such CO groups in a polymer chain.

It has been known for many years that olefins, e.g., ethylene and carbon monoxide, can be copolymerized or terpolymerized. The following listed patents are representative of the art pertaining to interpolymers of carbon monoxide and monoolefins: U.S. Pat. Nos. 2,495,292; 2,495,286; 2,497,323; 2,641,590; 3,083,184; 3,248,359; 3,530,109; 3,676,401; 3,689,460; 3,694,412; 3,780,140; 3,835,123; 3,929,727; 3,948,832; 3,948,873; 3,948,850; 3,968,082; 3,984,388; 4,024,104; 4,024,325; 4,024,326; 4,139,096; 4,304,887; and Canadian Patent 471,169.

Ungrafted ECO copolymer contains from about 0.5 to about 50 percent by weight CO, preferably from about 1 to about 40 weight percent CO, and more preferably from about 5 to about 30 percent by weight CO. The ECO copolymers are characterized by a melt index ($I_2$) in the range of from about 0.1 to about 1000 dg/min, and more preferably by an $I_2$ of from about 0.5 to about 50 dg/min. Practitioners of the relevant arts are aware that the melt index is generally inversely related to the molecular weight of the polymer. As used herein, melt index ($I_2$) is determined according to ASTM D-1238, condition E (190° C., 2.16 kg) unless otherwise stated.

ECO terpolymers have all the conventional physical properties of ECO copolymers with the addition of polar ester functionality which is known in the prior arts to enhance adhesion to some substrates. ECO-ester terpolymers are analogous ingredients to ECO copolymers in each area of the invention. The termonomer is operably present in an amount of from 0 to about 20 percent by weight of the ECO copolymer, preferably from 0 to about 15 percent by weight of the ECO copolymer.

The ECO polymer in accordance with the present invention is utilized in these embodiments: (a) an ECO copolymer grafted to have dicarboxylic acid functionality, (b) ungrafted ECO blended with HDPE, LLDPE, LDPE or like ethylene polymers having grafted dicarboxylic acid functionality, or (c) ungrafted ECO blended with the grafted ECO.

Adhesives comprising anhydride or dicarboxylic acid grafted polymers of ethylene are prepared as ingredients of the present blends. Polymers which may be suitably grafted with dicarboxylic functionality include, for example, HDPE, LDPE, LLDPE, ECO copolymers and the like. Grafted ECO copolymers can alternatively be utilized in accordance with the present invention in an unblended state exhibiting novel properties similar to the polymer blends.

The anhydride or dicarboxylic acid groups generally comprise from about 0.02 to about 6 weight percent of the grafted ethylene polymer, preferably from about 0.1 to about 3 percent by weight, most preferably from about 0.1 to about 2 percent by weight.

The HDPE suitable for grafting is a normally solid, high molecular weight polymer prepared using a coordination-type catalyst in a process wherein ethylene is homopolymerized or copolymerized with a small amount of $C_3$ to $C_8$ $\alpha$-olefins for property modification. The density range is about 0.940 to about 0.965 $g/cm^3$, but preferably from about 0.945 to about 0.960 $g/cm^3$.

The LLDPE suitable for grafting may have a density in the range of about 0.88 $g/cm^3$ to about 0.935 $g/cm^3$, preferably from about 0.90 $g/cm^3$ to about 0.925 $g/cm^3$. It is known to practitioners of the relevant arts that the density will depend, in large part, on the particular alkene(s) used as comonomer(s) and on the amount of the alkene(s) incorporated into the copolymer. The alkene(s) copolymerized with ethylene to make LLDPE comprises a minor amount of at least one olefinically unsaturated alkene of from $C_3$ to $C_{12}$, most preferably from $C_4$ to $C_8$; 1-octene is especially preferred The alkene(s) may constitute from about 0.5 percent to about 35 percent by weight of the copolymer, preferably about 1 percent to about 20 percent by weight, most preferably from about 2 percent to about 15 percent by weight.

The LDPE suitable for grafting is characterized as having a density in the range of from about 0.90 to about 0.935 $g/cm^3$, preferably from about 0.91 to about 0.93 $g/cm^3$.

The ECO copolymers which may be grafted and used in the present blends are essentially the same as the ungrafted ECO copolymers described hereinabove. While ECO copolymers exhibit a modicum of heat-activated or heat-induced adhesive properties to some substrates, it has been found that the present ECO copolymers grafted with dicarboxylic functionality exhibit greater adhesiveness in such instances, especially to such substrates as, polyvinylidene chloride (PVDC), aluminum, and steel. Surprising is the synergistically improved adhesive properties to these same substrates when ungrafted ECO is blended with, for example, maleic anhydride-grafted-ECO (ECO-g-MAH) or maleic anhydride-grafted-HDPE (HDPE-g-MAH).

The melt index ($I_{10}$) of the grafted polymers is preferably in the range of from about 0.01 to about 1000 dg/min, more preferably in the range of from about 0.05 to 20 dg/min. As used herein in reference to polymers following grafting, melt index ($I_{10}$) is determined according to ASTM D-1238, condition N (190° C./10.0kg) unless otherwise indicated.

The unsaturated dicarboxylic acid and anhydride compounds suitable as graft monomers, for which maleic acid and maleic anhydride are good examples, are known in these relevant arts as having their olefin unsaturation sites conjugated to the acid groups, in contradistinction to the fused ring and bicyclo structures of the non-conjugated unsaturated acids of e.g., U.S. Pat. Nos. 3,873,643 and 3,882,194 and the like. Fumaric acid, like maleic acid of which it is an isomer, is also conjugated. Fumaric acid, when heated, gives off water and rearranges to form maleic anhydride, thus is operable in the present invention. Conjugated, unsaturated dicarboxylic acids and anhydrides applicable as graft monomers include maleic acid, maleic anhydride, nadic anhydride, nadic methyl anhydride, himic anhydride, methyl himic anhydride, 7-endoxobicyclo[2.2.1]hept-5-2,3-dicarboxylic anhydride, tetrahydrophthalic anhydride, itaconic acid, and citraconic acid, but preferably maleic acid and maleic anhydride. Diacid adducts of the above anhydride monomers are acceptable as well.

The grafting, for example, of succinic acid or succinic anhydride groups onto ethylene polymers may be done by methods described in the art, which involve reacting maleic acid or maleic anhydride in admixture with heated polymer, generally using a peroxide or free-radical initiator to expedite the grafting.

Grafting may be effected in the presence of oxygen, air, hydroperoxides or other free radical initiators, or in the essential absence of these materials when the mixture of monomer and polymer is maintained under high shear in the absence of heat. A conventional method for producing the graft copolymer is the use of extrusion machinery, however, Brabender mixers or Banbury mixers, roll mills and the like may also be used for forming the graft copolymers.

We prefer to employ a twin-screw devolatilizing extruder (such as a Werner-Pfleiderer twin-screw extruder) wherein a dicarboxylic acid or anhydride thereof such as maleic acid (or maleic anhydride) is mixed and reacted with the ethylene polymer at molten temperatures, thereby producing and extruding the grafted polymer. The so-produced grafted polymer is then blended, as desired, with ECO copolymer to produce the blends of this invention, such as, for example, by dry blending and/or by using conventional mixing equipment such as extruders, mixers, roll mills and the like.

Novel, radio frequency (RF) heatable, adhesives comprising anhydride or dicarboxylic acid grafted polymers of ethylene blended with an ECO copolymer are prepared as embodiments in accordance with the present invention. The graft polymer may be operably blended with the ECO copolymer in a proportion of from about 1 to about 99 parts by weight of either blend ingredient wherein the parts by weight of the graft polymer and the ECO copolymer together total 100. Preferably, the blend comprises from about 5 to about 50 parts by weight of the grafted ethylene polymer and from about 50 to about 95 parts by weight of the ECO copolymer wherein the parts by weight of both ingredients total 100.

It is also known that there are additives (sensitizers) which can be blended into a polymer, e.g. polyethylene, to render it heatable by electromagnetic high-frequency energy, such as talc, $ZnCl_2$ carbon black, nylon, iron oxide, and others. Such additives, however, usually have a pronounced visual, physical, or chemical effect which, in some applications, is desirably avoided. Furthermore, when using additives as sensitizers one is faced with having to obtain a uniform distribution of the sensitizers in order to avoid "hot-spots" or arcing which can give irregular results and may even damage the polymer or other parts of the laminate.

The adhesive properties of the novel polymer blends which are an embodiment of this invention or grafted ECO copolymers which are another embodiment may be utilized by any convenient method, such as by hot-melt application, by post-heating of the adhesive in-situ on the substrate, by application of the adhesive in a carrier, such as in a solvent or as a dispersion in an aqueous carrier or in a non-solvent. The adhesive may be used in joining substrates of similar or dissimilar materials. As mentioned hereinbefore, these grafted polymers and blends thereof are also suitable for use as films or as other materials and have the beneficial property of being high-frequency heatable, especially at those frequencies which are in or near, the microwave range.

The grafted polymer blends are quite similar in optics and physical properties to the ungrafted polymers.

One aspect of the present invention concept is to create high-frequency sensitizer groups along the polymer chain. In this invention one does not encounter untoward visual effects in the polymer as a result of the sensitizer. Even in the present embodiments wherein an ECO copolymer is blended with grafted polymer (e.g., as a "masterbatch") in order to sensitize the whole, the polymers are generally compatible to an extent at which little or no visual effects are encountered. Thus, clear films of olefin polymers can be prepared, in accordance with the present invention, which are readily heat-sealed using high-frequency energy. It is especially of importance that the present invention provides polymers which are heatable by the action of microwave (MW) energy, a particular portion of the high-frequency energy range.

As used herein, "high-frequency heatability" refers to the bonding of the heatable polymer to a portion of itself or to another material using electromagnetic energy frequencies of 0.1–30,000 MHz. This includes radio-frequency (RF) heating and microwave (MW) heating in contradistinction to conventional heat sealing. The high-frequency range is generally taken to include electromagnetic waves over a broad frequency range (0.1–30,000 MHz) and covers the radio frequency (RF) range (1 MHz–300 MHz), and the microwave (MW) frequency range (300 MHz–10,000 MHz). The RF and MW ranges are of particular interest here, with special interests in the RF range.

Uses for this technology (polymer or blends) includes packaging applications where high speed and/or non-destructive seals are required, e.g. high-frequency activated adhesive films; extrusion coatings; moldings; hot melts in uses such as aseptic packaging, reactor pouches, sandwich bags, lamination of foam, fabric, or film layers; powder moldings, and the like. Furthermore, the present invention provides polymers suitable for use in RF extruders including continuous extruders or batch extruders. Wire and cable coatings can be applied in a continuous RF extruder by the present invention.

The polymers and blends of the present invention convert high-frequency electromagnetic radiation into heat for sealing, welding or fusing over a broad frequency range which allows one to have the option of using microwave frequencies for optimum speed in heating or sealing. Microwave sealing applications include microwave sealable plastic bags, toothpaste tube sealing, shampoo tube sealing, other microwave sealable containers, valve bag sealing, etc. This feature (heating or sealing over such a broad frequency) appears to be unique to ECO interpolymers and ethylene polymer blends containing ECO. Typically, ethylene copolymers may be heatable to some extent at low RF frequencies of 1 to 50 MHz, such as EVA, but none have been found which efficiently heat at the higher frequencies. Other examples of polymers heatable at low frequencies, but which do not efficiently heat at the higher frequencies are PVC, CPE, and nylon-6.

The advantages of heating polymers with high-frequency electromagnetic waves include faster and more efficient heating, heating through poor heat-conductors, e.g., paper or cardboard exteriors, stronger seals or bonds, improved economics based on efficient use of energy input, the ability to seal, bond or laminate larger surface areas, sealing of thicker or more complex film laminates, specific sealing, and the ability to seal wet surfaces at microwave frequencies where moisture couples with the energy to provide heat for the bonding.

Sealing rates can be determined utilizing the equation found in U.S. Pat. No. 4,601,948 to Lancaster et al. which is hereby incorporated herein by reference. An advantage to dicarboxylic acid functionality-containing ECO polymers and blends of the present invention, compared to the ECO polymers and blends containing interpolymerized monocarboxylic acid functionality of U.S. Pat. No. 4,601,948 is similar adhesive strength to aluminum and PVDC at a greatly reduced concentration of the acid monomer. Manufacturing advantages to this include, for example, reduced material costs and greatly reduced equipment costs in comparison to the more expensive equipment generally required to process the more corrosive, higher acid-containing streams.

There are also advantages to the ECO containing polymers and blends of this invention over other polymers (e.g., PVC, PVDC, CPE, EVA), that are sealable using radio frequency sealing methods which include, for example:

1. ECO is like conventional low density polyethylenes in physical properties and film appearance, i.e. higher melting point, low film blockage, easy processability, can be used for film extrusion coating and molding resin. Furthermore, the need for plasticizers is obviated.
2. CO can be copolymerized with ethylene and vinyl acetate to produce a CO-modified EVA polymer to render it more sealable and broadens the sealing frequency range.
3. CO containing copolymers or interpolymers have higher dielectric constants than EVA copolymers, allowing higher field strengths to be used without the fear of arcing.

Also within the purview of the present invention, useful laminates are prepared and a method by which they may be prepared is offered which utilize the adhesion properties to various substrates and the high-frequency electromagnetic radiation heatability of the carbon monoxide and dicarboxylic acid functionality containing polymers and polymer blends described above. Layers or piles of these polymers can be used as adhesives between layers of substrates which are not, themselves, efficiently suited for high frequency electromagnetic radiation sealing or bonding. Sheets or films of various substrates can be layered or coated at least in the area desired to be bonded, with these subject polymers and then sealed or bonded together using high-frequency electromagnetic radiation, especially those frequencies in the microwave range. Upon cooling multi-ply laminates of sheet or films of heterogeneous substrates can be utilized wherever multi-property laminate materials are useful, especially packaging and containing devices.

EXAMPLES 1-10

A maleic anhydride grafted ECO copolymer (ECO-g-MAH) was fabricated as follows:

An ECO copolymer having a melt index ($I_2$) of 9.91 dg/min was extruded with maleic anhydride (1.54 phr) in a solution of methyl ethyl ketone (50% maleic anhydride by weight) and 2,5-dimethyl-2,5-bis(t-butyl peroxyl) hex-3-yne at a weight ratio of peroxide to anhydride of 0.03:1 using a Werner-Pfleider twin-screw devolatilization extruder The temperature profile across the extruder heat zones was 140° C., 200° C., 190° C. and 136° C. with a 680.4 g/min throughput. The final incorporated concentration of maleic anhydride was 0.46 percent by weight (as determined by titration) with a final melt index ($I_2$) of 8.04 dg/min.

A maleic anhydride grafted HDPE (HDPE-g-MAH) was fabricated as follows:

An HDPE homopolymer having a melt index ($I_2$) of 10.0 dg/min and density of 0.960 g/cm$^3$ was extruded with maleic anhydride (1.0 phr) in a solution of methyl ethyl ketone (50% maleic anhydride by weight) and 2,5-dimethyl-2,5-bis-(t-butyl peroxyl)hex-3-yne at a weight ratio of peroxide to anhydride of 0.03:1 using a Werner-Pfleider twin-screw devolatilization extruder. The temperature profile across the extruder heat zones was 180° C., 200° C., 190° C., 165° C. with a 105.8 g/min throughput. The final incorporated concentration of maleic anhydride was 0.5% by weight ( as determined by titration) with a final melt index ($I_2$) of 1.09 dg/min.

Using a 25.4 mm extruder at an average temperature of 177° C., 1.4 kg samples of the above maleic anhydride grafted polymers were dry blended then melt blended with an ungrafted ECO copolymer to produce polymer blends. To determine the microwave sensitivity of the grafted polymers and blends thereof which embody this invention, 20 g of each sample shown below in Table I were placed in 8.9 cm diameter poly(tetrafluoroethylene) evaporating dishes, and these were placed in a Litton MinuteMaster microwave oven having a frequency of 2450 Hz. A setting of "high" was used for each test and the dwell time for melting all of the pellets was recorded.

TABLE I

| | TIME REQUIRED TO MELT RESIN SAMPLES IN A LITTON MINUTEMASTER MICROWAVE OVEN | | | | | |
|---|---|---|---|---|---|---|
| | RESIN COMPOSITION (wt. %) | | | | | MELT TIME |
| EXAMPLE | ECO[1] | ECO[2] | ECO[3] | ECO-g-MAH[4] | HDPE-g-MAH[5] | (min) |
| 1 | — | 100 | — | — | — | 2.5 |
| 2 | — | 90 | — | 10 | — | 2.5 |
| 3 | — | 80 | — | 20 | — | 2.5 |
| 4 | — | 50 | — | 50 | — | 2.5 |
| 5 | — | — | — | 100 | — | 2.5 |
| 6 | — | — | — | — | 100 | >25[6] |
| 7 | 100 | — | — | — | — | 6 |
| 8 | — | — | 100 | — | — | 3 |
| 9 | — | 80 | — | — | 20 | 5 |
| 10 | 50 | — | — | — | 50 | 22 |

[1]5 wt. % CO, 3.22 $I_2$.
[2]11 wt. % CO, 9.91 $I_2$.
[3]15 wt. % CO, 2.43 $I_2$.
[4]11 wt. % CO, 0.46% MAH, 9.0 $I_2$.
[5]0.5 wt. % 0.50% MAH, 1.09 $I_2$.
[6]Did not melt.

EXAMPLES 11-16

In order to determine the RF-sealability of the grafted polymers and blends of the present invention (see description in Examples 1-10) a Callahan 1½KW high-frequency electronic generator equipped with a 23.8 mm ×30.5 cm brass sealing electrode and operating over a frequency range of 20-40 MHz (RF) was utilized in the following sealing experiment. Films 0.04 mm to 0.06 mm thick blown from polymer materials of Table II were irradiated using the above RF sealer at various dwell settings (seal times) and power settings. The unit was set to about 27 MHz. The seals were examined and a seal was considered to have been made when the two sheets of material could not be separated at the seal point without tearing either piece of film. Table II shows how ECO copolymers grafted with dicarboxylic acid functionality maintained their original RF sealing property and how the addition of an ungrafted ECO copolymer to an ethylene polymer grafted with dicarboxylic acid functionality such as HDPE-g-MAH which is not RF sealable acquired this property.

TABLE II

| | RADIO FREQUENCY SEALABILITY | | | | | | |
|---|---|---|---|---|---|---|---|
| | RESIN COMPOSITION (wt. %) | | | | POWER | DWELL | |
| EXAMPLE | ECO[1] | ECO[2] | ECO-g-MAH[3] | HDPE-g-MAH[4] | SETTING | TIME (sec.) | SEALABLE |
| 11 | — | 100 | — | — | 50% | 1 | Yes |
| 12 | — | 90 | 10 | — | 50% | 1 | Yes |
| 13 | — | 80 | 20 | — | 50% | 1 | Yes |
| 14 | — | 50 | 50 | — | 50% | 1 | Yes |
| 15 | — | — | 100 | — | 50% | 1 | Yes |
| 16 | 50 | — | — | 50 | 40% | 2 | Yes |

[1]5 wt. % CO, 3.22 $I_2$.
[2]11 wt. % CO, 9.91 $I_2$.
[3]11 wt. % CO, 0.46 MAH, 8.0 $I_2$ (see description in Examples 1-10).
[4]0.5 wt. % MAH, 1.09 $I_2$ (see description in Examples 1-10).

The most difficult to seal polymer sample (Example 16) required only 2 seconds seal time at a 40% power setting. This sample, of course, had the smallest carbon monoxide concentration.

EXAMPLES 17-34

Films were fabricated from blends of HDPE-g-MAH and ungrafted ECO, as described in Examples 1-10, with a thickness of 0.04 mm using a Killion blown film unit with a 50.8 mm circular die and a 19 mm screw. The films were used in adhesive testing to various substrates. Adhesive tests, the results of which appear in Table III below, involved sealing a film of the polymer samples to be tested to a 0.04 mm thick nylon-6 cast film using an Askco heat seal unit having 9 heated zones. The temperature profile across the heated zones was 121° C., 132° C., 143° C., 154° C., 166° C., 177° C., 188° C., 199° C., and 210° C. A laminate of the film of the polymer sample being tested and the substrate of interest was constructed so that the peel strength of the test film was recorded against zone temperature. An Instron testing apparatus measured the final peel strength at each zone temperature by peeling apart the laminate. The laminate had a top layer which was a test substrate film, a second layer which was an adhesive film blown from the sample polymer blend, another layer which was a Mylar film release agent and a bottom layer which was Kraft paper (for support). The structure was sealed in the Askco unit at the indicated temperatures per zone for 6 seconds at a pressure of 0.28 MPa. Table III shows the adhesive strength of several concentrations of HDPE-g-MAH in ECO copolymers of 3 different compositions against zone temperature where nylon-6 is the test substrate. Table III shows better adhesive seals to nylon-6 at reduced seal temperatures for the blended polymer than either component separately.

TABLE III

PEEL STRENGTH OF BLENDED HDPE-g-MAH[1] IN ECO FROM NYLON-6 (N/m)

| EXAMPLE | ECO COPOLYMER wt. % CO | $I_2$ | PROPORTION OF HDPE-g-MAH (wt. %) IN BLEND | ZONE TEMPERATURE (°C.) | | | | | | | | |
|---|---|---|---|---|---|---|---|---|---|---|---|---|
| | | | | 121 | 132 | 143 | 154 | 166 | 177 | 188 | 199 | 210 |
| 17 | 5 | 3.22 | 0 (100% ECO) | 1.8 | 1.8 | 1.8 | 3.5 | 3.5 | 3.5 | 3.5 | 5.2 | 5.2 |
| 18 | 5 | 3.22 | 20 | 1.8 | 35.0 | 17.5 | 26.3 | 82.3 | CF[2] | | | |
| 19 | 5 | 3.22 | 25 | 1.8 | 3.5 | 24.5 | 66.6 | 73.6 | CF | | | |
| 20 | 5 | 3.22 | 30 | 1.8 | 3.5 | 38.5 | 56.0 | 91.1 | CF | | | |
| 21 | 5 | 3.22 | 50 | 0 | 1.8 | 17.5 | 45.5 | 40.3 | CF | | | |
| 22 | | | 100 (100% HDPE-g-MAH) | 0 | 0 | 1.8 | 8.8 | 21.0 | 87.6 | 113.8 | CF | |
| 23 | 10 | 2.97 | 0 (100% ECO) | 1.8 | 3.5 | 5.2 | 7.0 | 8.8 | 12.3 | 15.8 | 24.5 | 22.8 |
| 24 | 10 | 2.97 | 20 | 1.8 | 3.5 | 8.8 | 12.3 | 21.0 | CF | | | |
| 25 | 10 | 2.97 | 25 | 1.8 | 3.5 | 7.0 | 12.3 | CF | | | | |
| 26 | 10 | 2.97 | 30 | 1.8 | 1.8 | 12.3 | CF | | | | | |
| 27 | 10 | 2.97 | 50 | 1.8 | 1.8 | 8.8 | 38.5 | 75.3 | CF | | | |
| 28 | | | 100 (100% HDPE-g-MAH) | 0 | 0 | 1.8 | 8.8 | 21.0 | 8.76 | 11.38 | CF | |
| 29 | 15 | 2.43 | 0 (100% ECO) | 1.8 | 1.8 | 1.8 | 1.8 | 1.8 | 1.8 | 7.0 | 3.5 | 3.5 |
| 30 | 15 | 2.43 | 20 | 0 | 1.8 | 3.5 | 3.5 | 3.5 | 7.0 | 7.0 | 10.5 | 15.8 |
| 31 | 15 | 2.43 | 25 | 1.8 | 1.8 | 3.5 | 3.5 | 5.2 | 7.0 | 10.5 | 14.0 | 21.0 |
| 32 | 15 | 2.43 | 30 | 1.8 | 1.8 | 7.0 | 8.8 | 12.3 | 56.0 | CF | | |
| 33 | 15 | 2.43 | 50 | 1.8 | 1.8 | 36.8 | 36.8 | CF | | | | |
| 34 | | | 100 (100% HDPE-g-MAH) | 0 | 0 | 1.8 | 8.8 | 21.0 | 87.6 | 113.8 | CF | |

[1] 0.50 weight percent MAH, 1.09 $I_2$ (see description in Examples 1-10).
[2] CF (cohesive failure) indicates film breaking prior to peeling. In these cases, the films experience between 105.1 and 280.2 N/m equivalent peel strength force.

EXAMPLES 35-52

Films were fabricated from blends of HDPE-g-MAH and ungrafted ECO, as described in Examples 1-10, with a thickness of 0.04 mm using the film blowing equipment described in Examples 17-34. Adhesive tests, the results of which appear in Table IV below, involved sealing a film of the polymer samples to a 0.13 mm thick PVDC using an HST-09 Askco heat seal unit having 6 heated zones. The temperature profile across the heated zones was 121° C., 132° C., 143° C., 154° C., 166° C., and 177° C. The last three zones were turned off due to decomposition of PVDC at temperatures above 177° C. The procedure for testing the polymer blend samples for adhesion to PVDC substrate is described in Examples 17-34. Table IV shows better adhesive seals to PVDC at reduced seal temperatures for the blended polymer than either component separately.

TABLE IV

PEEL STRENGTH OF BLENDED HDPE-g-MAH[1] IN ECO FROM SARAN ® PVDC (N/m)

| EXAMPLE | ECO COPOLYMER wt. % CO | $I_2$ | PROPORTION OF HDPE-g-MAH (wt. %) IN BLEND | ZONE TEMPERATURE (°C.) | | | | | |
|---|---|---|---|---|---|---|---|---|---|
| | | | | 121 | 132 | 143 | 154 | 166 | 177 |
| 35 | 5 | 3.22 | 0 (100% ECO) | 10.5 | 17.5 | 21.0 | 28.0 | 31.5 | 49.0 |
| 36 | 5 | 3.22 | 20 | 5.2 | 10.5 | 15.8 | 15.8 | 15.8 | 31.5 |
| 37 | 5 | 3.22 | 25 | 1.8 | 3.5 | 5.2 | 5.2 | 7.0 | 10.5 |
| 38 | 5 | 3.22 | 30 | 3.5 | 8.8 | 12.3 | 15.8 | 21.0 | 21.6 |
| 39 | 5 | 3.22 | 50 | 0 | 0 | 1.8 | 1.8 | 3.5 | 5.2 |
| 40 | | | 100 (100% HDPE-g-MAH) | 0 | 0 | 0 | 0 | 0 | 1.8 |
| 41 | 10 | 2.97 | 0 (100% ECO) | 14.0 | 28.0 | 36.8 | 47.3 | CF[2] | |
| 42 | 10 | 2.97 | 20 | 24.5 | 42.0 | 49.0 | CF | | |
| 43 | 10 | 2.97 | 25 | 31.5 | 45.5 | CF | | | |
| 44 | 10 | 2.97 | 30 | 15.8 | 31.5 | CF | | | |
| 45 | 10 | 2.97 | 50 | 5.2 | 10.5 | 26.3 | 31.5 | 68.3 | CF |
| 46 | | | 100 (100% HDPE-g-MAH) | 0 | 0 | 0 | 0 | 0 | 1.8 |
| 47 | 15 | 2.43 | 0 (100% ECO) | 47.3 | 73.6 | CF | | | |
| 48 | 15 | 2.43 | 20 | 73.6 | CF | | | | |
| 49 | 15 | 2.43 | 25 | 96.3 | CF | | | | |

TABLE IV-continued
PEEL STRENGTH OF BLENDED HDPE-g-MAH[1] IN ECO FROM SARAN ® PVDC (N/m)

| EXAMPLE | ECO COPOLYMER wt. % CO | $I_2$ | PROPORTION OF HDPE-g-MAH (wt. %) IN BLEND | ZONE TEMPERATURE (°C.) 121 | 132 | 143 | 154 | 166 | 177 |
| --- | --- | --- | --- | --- | --- | --- | --- | --- | --- |
| 50 | 15 | 2.43 | 30 | 87.6 | CF | | | | |
| 51 | 15 | 2.43 | 50 | 3.5 | 7.0 | CF | | | |
| 52 | | | 100 (100% HDPE-g-MAH) | 0 | 0 | 0 | 0 | 0 | 1.8 |

[1]0.50 weight percent MAH, 1.09 $I_2$ (see description in Examples 1-10).
[2]CF (cohesive failure) indicates film breaking prior to peeling. In these cases, the films experience between 105.1 and 280.2 N/m equivalent peel strength force.

EXAMPLES 53-57

Sheets were cast from ECO-g-MAH and blends thereof with ungrafted ECO (see description in Examples 1-10) and adhesion tests performed using a wide range of substrates at room temperature according to the following procedures: On a 22.9 cm ×15.2 cm compression molder having two platens set at 177° C., and two platens water cooled, was molded a 0.64 mm plaque of material to be tested for adhesion. An appropriate amount of material to be molded was placed in the 0.64 mm mold between two sheets of Mylar, which, in turn was between two metal support plates. The support plates containing the resin and mold were placed between the 177° C. platens of the compression molder and the platens were closed and allowed to heat with no pressure for one minute. After this time period, 68.9 MPa platen pressure was applied for one minute. The support plates containing the mold and polymer were then removed and placed in the water cooled section for one minute. The Mylar was removed and the polymer was cut from the mold using a razor blade against a clean, hard surface.

The molded specimen (22.9 cm ×15.2 cm) was placed against a substrate (at least 22.9 cm ×15.2 cm) with a Mylar film tab (7.6 cm ×22.9 cm) centered in traverse manner between the test specimen and substrate, leaving about 3.8 cm of the tab protruding from each side of the so-formed "sandwich." then a Mylar film (30.5 cm ×30.5 cm) placed on each side of the specimen/substrate sandwich and a steel support plate and placed against each of the Mylar films. ("Mylar" is the well-known DuPont tradename for polyethylene terephthalate.) The sandwich structure described above was placed between the hot (177° C.) platens of a compression molder and pressed immediately to 68.9 MPa and held there for two minutes. After this, the sandwich was removed from the hot platens and placed between the cool platens for two minutes. The sandwich was removed from the press and the Mylar film was removed from each side of the polymer/substrate laminate.

The laminate was then cut longitudinally into five equal 2.5 cm wide strips. Each of five test strips were peeled back slightly by hand and mounted (clamped) in the Instron tensile tester. The Instron was run at a pulling rate of 5.1 cm/min at a free hanging peel angle and the tensile force was recorded on a strip chart until about 5.1-7.6 cm had been peeled. The average of the five peels was taken as the adhesion strength.

The following substrates were used:
1. Electrolytic chromium coated steel (ECCS) had a thickness of 0.15 mm; this steel was chosen due to its popular use in polyolefin applications.
2. Aluminum was coiled aluminum, 0.13 mm thick, 45.7 cm wide, grade 3003-H14.
3. The copper was copper sheet, 110 alloy, fully annealed, 99% pure, 0.13 mm thick.
4. The nylon-6 was a film 0.17 mm thick and 50.8 cm wide.
5. The oriented polypropylene (OPP) was a film grade 0.04 mm thick and 15.2 cm wide.
6. The non-oriented polypropylene (PP) film was 0.13 mm thick and 15.2 cm wide.

The data from Table V indicate synergistically improved adhesion to steel, aluminum, copper and PVDC of the blended polymer samples compared to samples prepared from either component separately.

TABLE V
PEEL STRENGTH OF BLENDED ECO-g-MAH[1] IN ECO[2] FROM VARIOUS SUBSTRATE MATERIALS (N/m)

| EXAMPLE | PROPORTION OF ECO-g-MAH (wt. %) IN BLEND | BLEND $I_2$ | BLEND DENSITY (g/cm³) | SUBSTRATE MATERIALS Steel | Cu | Al | Nylon | PVDC | OPP | PP |
| --- | --- | --- | --- | --- | --- | --- | --- | --- | --- | --- |
| 53 | 0 (100% ECO) | 4.91 | 0.989 | 612.9 | 175.1 | 420.3 | 22.8 | >437.8[3] | 3.5 | 3.5 |
| 54 | 10 (0.05% MAH) | 10.86 | 0.986 | >1646.2 | 262.7 | >2101.5 | 21.0 | >420.3 | 1.8 | 3.5 |
| 55 | 20 (0.09% MAH) | 9.98 | 1.032 | >2101.5 | 297.7 | >1891.4 | 21.0 | >893.2 | 1.8 | 5.2 |
| 56 | 50 (0.23% MAH) | 9.93 | 1.935 | >2189.1 | 315.2 | >1698.7 | 24.5 | >1155.8 | 1.8 | 3.5 |
| 57 | 100 (100% ECO-g-MAH) | 8.04 | 0.989 | >1348.5 | 280.2 | 788.1 | 22.8 | >788.1 | 1.8 | 5.2 |

[1]11% CO by weight, 0.46 MAH by weight, 8.04 $I_2$ (see description in Examples 1-10).
[2]11% CO by weight, 9.91 $I_2$.
[3]> symbol indicates cohesive failure of sample or substrate at the stated test strength.

EXAMPLES 58-74

Sheets were Cast from HDPE-g-MAH and blends thereof with ungrafted ECO (see description in Examples 1-10) and adhesion tests were performed on a variety of substrates at room temperature according to the procedures of examples 53-57.

The adhesive data are presented in Table VI. It must be noted from the data that those substrate materials which showed good adhesive peel strength with films of HDPE-g-MAH blended with ECO, the blended polymer films materially failed at lower peel strengths than measurably achieved for the component HDPE-g-MAH alone which suffered adhesion failure.

TABLE VI

PEEL STRENGTH OF BLENDED HDPE-g-MAH[1] IN ECO FROM VARIOUS SUBSTRATE MATERIALS (N/m)

| EXAMPLE | ECO COPOLYMER wt. % CO | ECO $I_2$ | BLEND $I_2$ | BLEND δ (g/cm³) | PROPORTION OF HDPE-g-MAH (wt. %) IN BLEND | ECCS | Cu | Al | Nylon-6 | OPP | PP |
|---|---|---|---|---|---|---|---|---|---|---|---|
| 58 | 5 | 1.93 | — | 0.943 | 0 (100% ECO) | 945.7 | 210.2 | 178.0 | 70.0 | 17.5 | 17.5 |
| 59 | 5 | 1.93 | 2.97 | 0.983 | 20 | CF[2] | CF | CF | 122.6 | 17.5 | 17.5 |
| 60 | 5 | 1.93 | 2.86 | 0.993 | 30 | CF | CF | CF | 122.6 | 17.5 | 17.5 |
| 61 | 5 | 1.93 | 2.36 | 0.991 | 50 | CF | CF | CF | 157.6 | 35.0 | 17.5 |
| 62 | | | 1.01 | 0.950 | 100 (100% HDPE-g-MAH) | 3677.7 | 577.9 | 2434.3 | 105.1 | CF | CF |
| 63 | 10 | 2.79 | — | 0.970 | 0 (100% ECO) | 0 | 0 | 0 | 17.5 | 17.5 | 17.5 |
| 64 | 10 | 2.79 | 2.81 | 0.966 | 20 | CF | CF+ | CF | 0 | 17.5 | 17.5 |
| 65 | 10 | 2.79 | 2.51 | 0.963 | 25 | CF | CF | CF | 35.0 | 17.5 | 17.5 |
| 66 | 10 | 2.79 | 2.42 | 0.963 | 30 | CF | CF | CF | 17.5 | 17.5 | 17.5 |
| 67 | 10 | 2.79 | 7.01 | 0.990 | 50 | CF | CF | CF | 35.0 | 70.0 | 35.0 |
| 68 | | | 1.01 | 0.950 | 100 (100% HDPE-g-MAH) | 3677.7 | 577.9 | 2434.3 | 105.1 | CF | CF |
| 69 | 15 | 1.85 | — | 0.961 | 0 (100% ECO) | 0.7 | 0.5 | 0 | 52.5 | 0 | 17.5 |
| 70 | 15 | 1.85 | 1.67 | 0.982 | 20 | CF | 0.8 | CF | 17.5 | 0 | 17.5 |
| 71 | 15 | 1.85 | 1.70 | 0.979 | 25 | CF | 175.1 | CF | 17.5 | 17.5 | 35.0 |
| 72 | 15 | 1.85 | 1.71 | 0.977 | 30 | CF | 297.7 | CF | 17.5 | 17.5 | 17.5 |
| 73 | 15 | 1.85 | 1.60 | 0.971 | 50 | CF | CF | CF | 52.5 | 105.1 | 52.5 |
| 74 | | | 1.01 | 0.950 | 100 (100% HDPE-g-MAH) | 3677.7 | 579.9 | 2434.3 | 105.1 | CF | CF |

[1]0.50 weight percent MAH, 1.09 $I_2$ (see description in Examples 1–10).
[2]CF (cohesive failure) indicates breaking of the sample sheet prior to peeling. In these cases, the polymer experienced between 350.2 and 1576.1 N/m of equivalent peel strength force. The blended materials appeared more brittle than the HDPE-g-MAH component.

The foregoing description of the invention is illustrative and various modifications will become apparent to those skilled in the art in view thereof. It is intended that all such variations which fall within the scope and spirit of the appended claims be embraced thereby.

What is claimed is:

1. An adhesive, RF heatable polymer blend, comprising:
   (a) an ethylene-carbon monoxide copolymer blended with;
   (b) a grafted ethylene polymer, said grafted ethylene polymer obtained by grafting an ethylene polymer with a graft monomer selected from the group consisting of α, β-ethylenically unsaturated dicarboxylic acids and anhydrides thereof.

2. The polymer blend of claim 1, wherein said polymer blend comprises from about 1 to about 99 parts by weight of said ethylene-carbon monoxide copolymer and from about 1 to about 99 parts by weight of said grafted ethylene polymer, wherein the parts by weight of said copolymer and said ethylene polymer total 100.

3. The polymer blend of claim 1, wherein said copolymer comprises from about 0.5 to about 50 percent by weight carbon monoxide.

4. The polymer blend of claim 1, wherein said graft monomer comprises from about 0.02 to about 6 percent by weight of the grafted ethylene polymer.

5. The polymer blend of claim 1, wherein said ethylene-carbon monoxide copolymer has a melt index ($I_2$) from about 0.1 dg/min to about 1000 dg/min.

6. The polymer blend of claim 1, wherein said ethylene polymer which is grafted is selected from the group consisting of HDPE, LDPE, LLDPE and ECO copolymer.

7. The polymer blend of claim 1, wherein said grafted ethylene polymer has a melt index ($I_{10}$) of from about 0.01 dg/min to about 1000 dg/min 8. An adhesive, RF heatable polymer blend, comprising:
   (a) from about 1 to about 99 parts by weight of an ethylene-carbon monoxide copolymer comprising from about 0.5 to about 50 percent by weight carbon monoxide and having a melt index ($I_2$) from about 0.1 dg/min to about 1000 dg/min; and
   (b) blended therewith, from about 1 to about 99 parts by weight of a grafted ethylene polymer, wherein the parts by weight of said ethylene-carbon monoxide copolymer and said grafted ethylene polymer total 100, said grafted ethylene polymer obtained by grafting an ethylene polymer, selected from the group consisting of HDPE, LDPE, LLDPE, and ECO copolymer, with a graft monomer selected from the group consisting of α, β-ethylenically unsaturated dicarboxylic acids and anhydrides, said graft monomer comprising from about 0.02 to about 6 percent by weight of the grafted ethylene polymer, said grafted ethylene polymer having a melt index ($I_{10}$) from about 0.01 dg/min to about 1000 dg/min.

9. The polymer blend of claim 8, wherein said polymer blend comprises from about 50 to about 95 parts by weight of said ethylene-carbon monoxide copolymer.

10. The polymer blend of claim 8, wherein said ethylene-carbon monoxide copolymer comprises from about 1 to about 40 percent by weight carbon monoxide.

11. The polymer blend of claim 8, wherein said ethylene-carbon monoxide copolymer comprises from about 60 to about 99 percent by weight ethylene.

12. The polymer blend of claim 8, wherein said ethylene-carbon monoxide copolymer further includes a termonomer selected from the group consisting of hydrocarbyl esters of α, β-ethylenically unsaturated carboxylic acids and vinyl esters of saturated carboxylic acids.

13. The polymer blend of claim 8, wherein said grafted ethylene polymer comprises a grafted terpolymer of ethylene, carbon monoxide and a termonomer selected from the group consisting of hydrocarbyl esters of α, β-ethylenically unsaturated carboxylic acids and vinyl esters of saturated carboxylic acids.

14. The polymer blend of claim 8, wherein said graft monomer comprises from about 0.10 to about 3 percent by weight of said grafted ethylene polymer.

15. The polymer blend of claim 8, wherein said graft monomer is selected from the group consisting of maleic anhydride, nadic anhydride, nadic methyl anhydride, himic anhydride, methyl himic anhydride, 7-endoxobicyclo[2.2.1]hept-5-ene-2,3-dicarboxylic anhydride, tetrahydrophthalic anhydride, itaconic anhydride, citraconic anhydride, and diacid adducts thereof.

16. An adhesive, RF heatable polymer blend, comprising:
 (a) from about 50 to about 95 parts by weight of a carbon monoxide-containing ethylene copolymer comprising from about 1 to 40 percent by weight carbon monoxide and from 0 to about 20 percent by weight of a termonomer selected from the group consisting of hydrocarbyl esters of α, β-ethylenically unsaturated carboxylic acids and vinyl esters of saturated carboxylic acids, said copolymer having a melt index ($I_2$) from about 0.5 dg/min to about 50 dg/min; and
 (b) blended therewith from about 5 to about 50 parts by weight a grafted ethylene polymer, wherein the parts by weight of said ethylene copolymer and said grafted ethylene polymer total 100, said grafted ethylene polymer obtained by grafting an ethylene polymer, selected from the group consisting of HDPE, LDPE, LLDPE and ECO copolymer, with a graft monomer selected from the group consisting of maleic anhydride, nadic anhydride, nadic methyl anhydride, himic anhydride, methyl himic anhydride, 7-endoxo-bicyclo[2.2.1]hept-5-ene-2,3-dicarboxylic anhydride, tetrahydrophthalic anhydride, itaconic anhydride, citraconic anhydride and diacid adducts thereof, said graft monomer comprising from about 0.10 to about 3 percent by weight of the grafted ethylene polymer, said grafted ethylene polymer having a melt index ($I10$) from about 0.05 dg/min to about 20 dg/min.

17. The polymer blend of claim 16, wherein said carbon monoxide-containing copolymer comprises from about 5 to about 30 percent by weight carbon monoxide.

18. The polymer blend of claim 16, wherein said carbon monoxide-containing copolymer comprises from 0 to about 15 percent by weight of said termonomer.

19. The polymer blend of claim 16, wherein said termonomer comprises methyl acrylate, methyl methacrylate, ethyl acrylate or vinyl acetate.

20. The polymer blend of claim 16, wherein said ethylene polymer before said grafting comprises HDPE having a density from about 0.94 to about 0.965 g/cm$^3$ and a melt index ($I_2$) from about 0.50 dg/min to about 50 dg/min.

21. The polymer blend of claim 16, wherein said ethylene polymer before said grafting comprises LLDPE having a density from about 0.88 to about 0.935 g/cm$^3$ and a melt index ($I_2$) from about 0.50 dg/min to about 50 dg/min.

22. The polymer blend of claim 16, wherein said ethylene polymer before said grafting comprises LDPE having a density from about 0.90 to about 0.935 g/cm$^3$ and a melt index ($I_2$) from about 0.50 dg/min to about 50 dg/min.

23. The polymer blend of claim 16, wherein said ethylene polymer before said grafting comprises ECO copolymer comprising from about 0.5 to about 50 percent by weight carbon monoxide, from about 30 to about 99.5 percent by weight ethylene and from 0 to about 20 percent by weight of a termonomer selected from a group consisting of hydrocarbyl esters of α, β-ethylenically unsaturated carboxylic acids and vinyl esters of saturated carboxylic acids, said ECO copolymer having a melt index ($I2$) from about 0.50 dg/min to about 50 dg/min.

24. The polymer blend of claim 16, wherein said graft monomer comprises maleic acid or maleic anhydride.

25. An adhesive, RF heatable grafted polymer, comprising:
 a copolymer of ethylene and carbon monoxide grafted with at least one graft monomer selected from the group consisting of α, β-ethylenically unsaturated dicarboxylic acids and anhydrides thereof.

26. An adhesive, RF heatable polymer blend, comprising:
 (a) a grafted polymer comprising a copolymer of ethylene and carbon monoxide grafted with at least one graft monomer selected from the group consisting of α, β-ethylenically unsaturated dicarboxylic acids and anhydrides; and
 (b) blended therewith, an ungrafted ethylene-carbon monoxide copolymer.

* * * * *